United States Patent [19]
Feuerstein et al.

[11] Patent Number: 6,055,230
[45] Date of Patent: Apr. 25, 2000

[54] EMBEDDED DIGITAL BEAM SWITCHING

[75] Inventors: Martin J. Feuerstein, Redmond; Sheila Reynolds, Bellevue; Yingjie Li, Redmond; Mark Reudink, Issaquah; Douglas O. Reudink, Bellevue, all of Wash.

[73] Assignee: Metawave Communications Corporation, Redmond, Wash.

[21] Appl. No.: 08/924,741

[22] Filed: Sep. 5, 1997

[51] Int. Cl.[7] ........................................... H04J 13/00
[52] U.S. Cl. ............................... 370/335; 370/342
[58] Field of Search ............................. 370/320, 334, 370/335, 342, 441; 455/562, 25, 561; 342/354, 359, 374

[56] References Cited

U.S. PATENT DOCUMENTS

| | | | |
|---|---|---|---|
| 5,576,717 | 11/1996 | Searle et al. | 342/373 |
| 5,594,941 | 1/1997 | Dent | 370/310 |
| 5,621,752 | 4/1997 | Antoino et al. | 375/200 |
| 5,628,052 | 5/1997 | DeSantis et al. | 370/334 |
| 5,736,959 | 4/1998 | Patterson et al. | 342/354 |
| 5,757,767 | 5/1998 | Zehavi | 370/320 |
| 5,764,630 | 6/1998 | Natali et al. | 370/335 |
| 5,838,669 | 11/1998 | Gerakoulis | 370/320 |
| 5,848,060 | 12/1998 | Dent | 370/281 |

FOREIGN PATENT DOCUMENTS

| | | | |
|---|---|---|---|
| 0639035 A1 | 2/1995 | European Pat. Off. | H04Q 7/36 |
| 0725498 A1 | 8/1996 | European Pat. Off. | H04B 7/36 |
| 0774700 A2 | 6/1997 | European Pat. Off. | H04Q 7/36 |

OTHER PUBLICATIONS

PCT International Search Report on International application No. PCT/US 98/24119 (4 pages).

*Primary Examiner*—Huy D. Vu
*Assistant Examiner*—Jasper Kwoh
*Attorney, Agent, or Firm*—Fulbright & Jaworski L.L.P.

[57] ABSTRACT

Disclosed is a system utilizing a multi-beam antenna and switches the beams to a CDMA demodulation receiver in such a way that the best beams are selected. The transmit path takes the traffic channel outputs from the CDMA modulators and maps each traffic channel to the subset of beams that have the best path to the mobile in the forward link. According, the system operates to reduce interference on both the forward and reverse links, as well as to increase the capacity of both the forward and reverse links. The system also is capable of providing flexible dynamic shaping of the cell and the sectors by mapping the appropriate overhead channels on the forward link and the reverse link in different combinations of beams to sectors in order to shape the cell.

52 Claims, 3 Drawing Sheets

EMBEDDED DIGITAL BEAM SWITCHING

RELATED APPLICATIONS

The present application is being concurrently filed with U.S. application Ser. No. 08/924,285, entitled "ANTENNA DEPLOYMENT SECTOR CELL SHAPING SYSTEM AND METHOD", having a common assignee, which application is hereby incorporated by reference. Reference is also hereby made to the following co-pending and commonly assigned U.S. patent applications: Ser. No. 08/902,057, entitled "SIGNAL FEED MATRIX LPA REDUCTION SYSTEM AND METHOD," Ser. No. 08/901,932, now issued as U.S. Pat. No. 5,917,317, entitled "SIGNAL FEED MATRIX AMPLIFIER REDUCTION SYSTEM AND METHOD"; the disclosures of which applications are incorporated herein by reference.

TECHNICAL FIELD OF THE INVENTION

This invention relates in general to multi-beam antennas applied to direct sequence CDMA. More specifically, this invention relates to systems and methods for switchably combining multiple beam signals for provision to sector inputs of a CDMA transceiver and for switchably coupling sector outputs of a CDMA transceiver to multiple antenna beams.

BACKGROUND OF THE INVENTION

In a spread spectrum CDMA system, multiple communication units, or mobile systems, operate on a single frequency separated only by a particular CDMA code and/or a CDMA code delay defining a CDMA channel. Typically these CDMA channels are available throughout a cell, or sector of the cell. However, radiation of a CDMA channel within an area of the cell in which the particular communication unit assigned to the CDMA channel is not operating only serves to increase the interference energy experienced by other communication units operating on that frequency.

In order to obtain performance from a multi-beam antenna with a CDMA base station, the system must be able to despread and separate the transmitted and received signals that are using different codes or different code delays. In this way, it would be possible to restrict radiation of a particular CDMA channel to only within an area most likely to actually be utilized by a communication unit assigned to the CDMA channel. However, in order to isolate transmission of a CDMA channel to a particular area within the cell, a multi-beam antenna system is preferably utilized.

Accordingly, there exists a need in the art for a system and method for equipping a CDMA base station to dynamically restrict communication with communication units to selected beams of a multi-beam antenna system. However, a problem exists in the use of such a multi-beam antenna with a typical CDMA base station in that the traditional inputs and outputs from such a base station are at the radio frequency level. They contain a composite of all of the transmitted and received signals on the same frequency. It is difficult, if not impossible, to separate one user signal, or channel from another unless the system obtains information about the transmitted and received codes and the timing of those codes so that the traffic channel signals for one user can be broken apart from the signals of another user.

In the literature on CDMA systems, there is work that has been published and examined for integrating or combining multi-beam antennas with CDMA systems on the reverse link because it is relatively easy to model and relatively easy to get an estimate of the interference environment and the channels on the reverse path. It shall be appreciated that, unlike the reverse link, there are significant problems in modeling the forward link of a CDMA system. Likewise, getting estimates of the interference environment and the channel conditions of the forward link of a CDMA system is very difficult. Accordingly, a need exists in the art for a scheme of simplifying the processing on the forward link while still getting an interference reduction and a capacity gain on the forward link.

A need in the art exists for a system and method adapted to continuously switch the best signals from a multi-beam antenna system into the demodulation receiver of a CDMA base station in order that the receiver is able to make best use of all of the signals that are available from this multi-beam antenna.

A further need exists in the art for a system and method adapted to update selection of the best signals from a multi-beam antenna system in such a way that the channel environment and the motion of the mobile does not change too dramatically over the time in which the switching is accomplished.

A need also exists in the art for a system and method adapted in the forward link to transmit only on a minimum number of beams that have a good communications link to the mobile. Accordingly, transmit energy is not wasted on beams that are not radiating in the direction of the mobile and, thus reduction of overall interference on the forward link and improved capacity of the forward link is experienced.

SUMMARY OF THE INVENTION

These and other objects, features and advantages are achieved in a system and method utilizing embedded hardware in a CDMA base station in order to accomplish beam switching based on despread signals. Accordingly, in the receive path, the invention uses the normal receive chain typically found in a CDMA cell site. Additionally, the invention is able to use the demodulation receiver typically found in a direct sequence CDMA cell site.

According to a preferred embodiment of the present invention, a CDMA cell site is modified to insert a digital switching function in the baseband receive signals prior to being despread by the receiver. On the received path, the elements that are preferably inserted in the base station are a digital switch function and a control function to operate the switch.

The present invention operates to take the inputs from a typical multi-beam antenna, a preferred embodiment having twelve such beams, and switch those beams so that the best beams, the preferred embodiment switching six such beams, are always routed into the cell site demodulation. Preferably, the switching of the present invention is based on the output from the demodulation receiver. The demodulation receiver is continuously providing estimates of a signal interference ratio on the, typically 6 (3 sectors times 2 diversity inputs per sector), inputs that it contains. The digital switch function or the digital switch matrix is updated based on those six signal interference ratio reports.

On the transmit path, the present invention uses the normal modulator function in a CDMA base station to map the traffic channel for providing CDMA channels only to beams or to beams on sectors that have the best link to the mobile assigned to the CDMA channel. The channel element modulator outputs for each traffic channel are routed to beams that are in strongest contact with the mobile.

It shall be appreciated that, according to the present invention, the transmit chain, the conversion to radio frequency and the amplification, are exactly as you would have in a typical base station. The only part of this invention that is inserted in the transmit path is a digital mapping function at baseband to select beams for each user.

On the transmit path, for some CDMA implementations, there would be overhead channels, pilot synchronization and paging channels, that require simulcast transmission over multiple beams. The digital switch matrix on the transmit path handles this by taking outputs from the channel elements that are generating these overhead channels, pilot paging synchronization, and routing those to the appropriate beams on each sector in a simulcast fashion. Accordingly, a composite radiation pattern is generated, i.e., a radiation pattern is synthesized that approximates what a traditional sector antenna would cover.

Technical advantages of the present invention on the forward link include: reducing the average transmittal power required for mobile; improving the capacity on the forward link; reducing overall interference levels on the forward link; reducing the probability of a sector running out of transmit power or going into overload conditions; and reducing the probability the sector has traffic beyond its handling capacity.

Technical advantages of the present invention on the reverse link include: reducing the overall network wide interference levels; and improving the signal interference ratio achievable at the cell site for each of the users.

Moreover, technical advantages of the present invention are realized in originating and terminating calls by improving the probability that a given mobile has a single dominant server for a cell site or has a small number of dominant servers, so to reduce the number of areas where multiple servers, such as five or six servers, have the potential of being a serving cell site for any particular user.

Another technical advantage of the present invention is to reuse as much as the component parts of a traditional CDMA base station as possible. On the receive side the present invention uses the normal receive chain of components and the modulator circuitry. Likewise, on the transmit side the present invention uses the modulator circuitry and the transmission path chain that exists in a normal cell site, inserting the minimum number of components possible to integrate the multi-beam antenna with the base station.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

Figure 1:
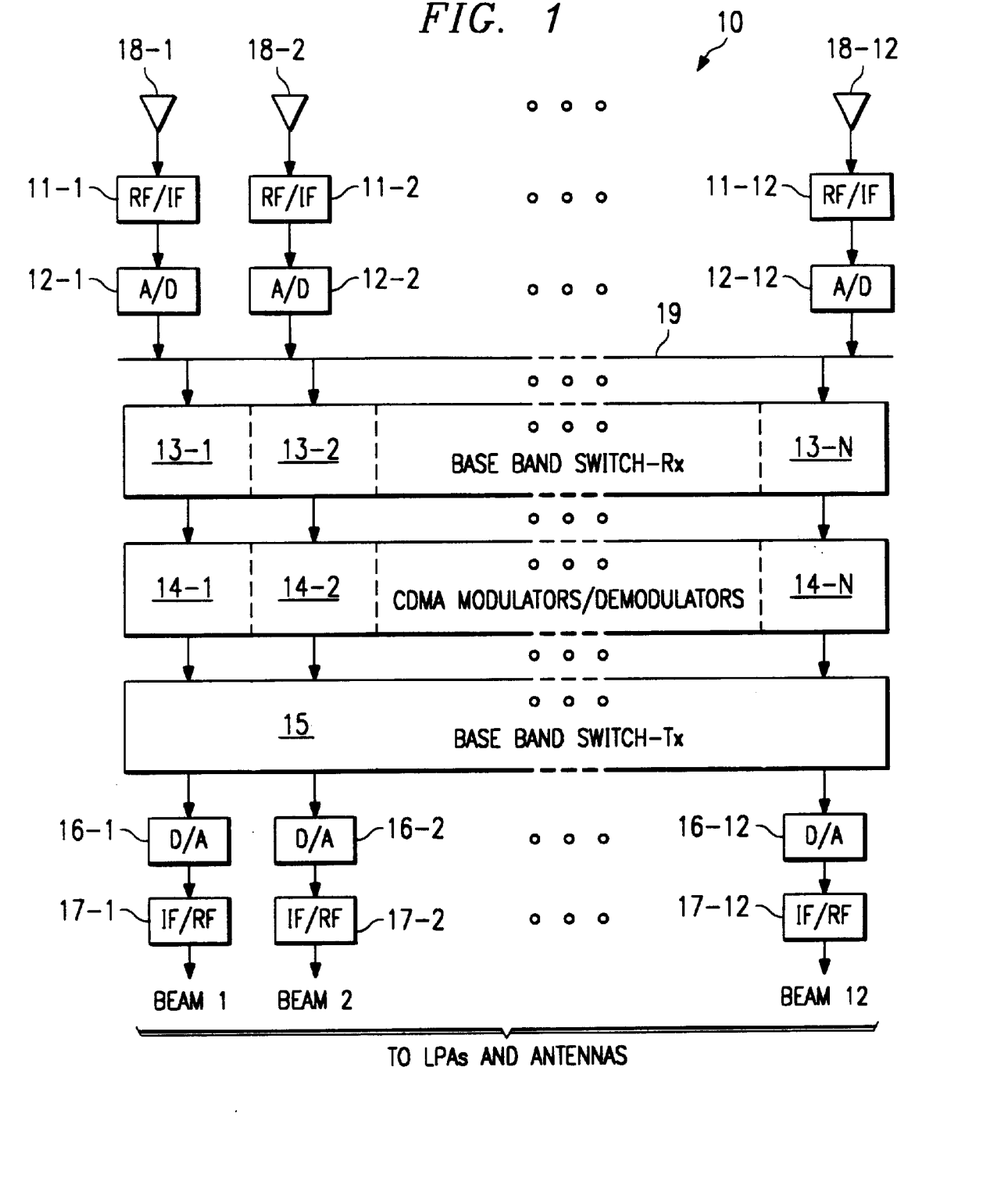
FIG. 1 illustrates a high level block diagram of a base transceiver station of the present invention.

It is helpful, in understanding the inventive concept of the present invention, to understand the overall flow of call data through a cell site or base transceiver station (BTS) of the present invention. Accordingly, a high level block diagram of BTS 10 adapted according to the present invention is illustrated in FIG. 1.

Directing attention to FIG. 1, the flow of call data will be described. The top portion of FIG. 1 shows antennas 18-1 through 18-12 where the received signal enters the cell site. In the illustrated preferred embodiment, twelve narrow beam antennas disposed to provide a substantially non-overlapping 360° composite radiation pattern are utilized. However, it shall be appreciated that any number of antenna beams may be utilized according to the present invention. Furthermore, a multi-beam antenna may be utilized rather than the discrete antennas illustrated in FIG. 1. Accordingly, as used hereinafter, the terms multi-beam antenna and multi-beam system shall be defined to include both a combination of discrete antennas each adapted to provide individual antenna beams and antenna providing multiple beams.

The signals received by each of antennas 18-1 through 18-12 pass through radio frequency to intermediate frequency conversion circuitry, RF/IF converters 11-1 through 11-12 respectively. Thereafter, the signals are passed to analog digital conversion units, A/D converters 12-1 through 12-12 respectively. Accordingly, there is a chain of antenna, RF/IF converter, and A/D converter for each of the twelve antenna beams of the multi-beam system.

It shall be appreciated that the A/D converters of the present invention may include circuitry in addition to that required for analogue to digital conversion. For example, automatic gain control (AGC) circuitry may be included to provide a receive signal having a desired power level. Likewise, interference canceling circuitry may be included to improve receive signal quality. Of course, such additional circuitry may be disposed at other points in the signal path rather than within the analogue to digital converters, if desired.

The output of the A/D converters 12-1 through 12-12 feed into a baseband receive switch, illustrated as a bank of switch matrix units 13-1 through 13-N. There is a switch unit for each of the N traffic channels in use at the cell site. Preferably, the signal received by any of antennas 18-1 through 18-12 is available for switching by any of switch matrix units. Accordingly, means for providing the received signals associated with each of the antenna beams to each of the switch matrix units, such as digital bus 19 routing all twelve beam receive signals to each one of the baseband receive switch units, is provided. Access to the receive signals at each CDMA demodulator is accomplished by having all twelve of the receive chains, from each of the receive beams, routed to digital bus 19 so that each of the baseband receive switching elements 13-1 through 13-N have access to all the signals input into digital bus 19. With this arrangement each of the switch elements can access all twelve of the receive signals simultaneously and, thus, pass any desired signal to an associated CDMA demodulator element.

The switch matrix units 13-1 through 13-N feed signals into a CDMA demodulator or CDMA receiver, illustrated as a part of CDMA modulators/demodulators 14-1 through 14-N. Each CDMA demodulator despreads the signal provided to it by its associated switch matrix unit, and decodes the traffic data that is transmitted on the reverse link from the mobile to the cell site. This traffic data is then transferred to the cellular network for use in providing cellular communications as is well known in the art.

The baseband receive switch and CDMA modulator/demodulator include elements that are assigned to each traffic channel or each user that is active in the cell site depicted in BTS 10. Accordingly, each traffic channel would be assigned to one of the baseband receive switch elements and one of the CDMA modulator/demodulator elements. As such, the signal received by any of antennas 18-1 through 18-12 is available for switching to any of the CDMA modulator/demodulator elements and, therefore, a traffic channel appearing in any of the antenna beams may be switched to a particular assigned CDMA modulator/demodulator element.

On the transmit side or forward link, the CDMA modulator or CDMA transmitter, illustrated as a part of CDMA modulators/demodulators 14-1 through 14-N, feeds traffic data out to a baseband transmit switch, illustrated as baseband transmit switch 15, that routes traffic channel data only on specific selected antenna beams. The particular antenna beams to which a particular traffic channel is routed is selected to provide the best paths from the cell site to the mobile. For example, if the mobile is in handoff with multiple sectors of the cell site, then the baseband transmit switch 15 routes the signals associated with that particular traffic channel to the appropriate sectors, i.e., appropriate antenna beams, at the cell site. It shall be appreciated, in a preferred embodiment of the present invention, that baseband transmit switch is adapted with a number of inputs and outputs to provide the ability to switch any output of CDMA modulators/demodulators 14-1 through 14-N to any antenna beam available at the cell site. Accordingly, as in the combination of bus 19 and the baseband receive switch, there is not a one to one correspondence between the CDMA modulator inputs and antenna beam outputs of baseband transmit switch 15.

The output of baseband transmit switch 15 feeds a chain of digital analog converters, D/A converters 16-1 through 16-12. D/A converters 16-1 through 16-12 in turn feed intermediate frequency to radio frequency converters, IF/RF converters 17-1 through 17-12 respectively. Accordingly, there is a separate digital to analog converter and intermediate frequency to radio frequency converter chain for each of the twelve beams of the preferred multiple beam system. After passing through the chain, the signals are radiated by the cell site for reception by the mobile units operating therein.

Preferably, radiation of the signals includes the use of linear power amplifiers (LPAs) in the forward link signal path (not shown) to provide the desired amplification of the signals. Arrangements of banks of LPAs suitable for use according to the present invention are shown in copending, commonly assigned, U.S. patent applications entitled "SIGNAL FEED MATRIX LPA REDUCTION SYSTEM AND METHOD" and "SIGNAL FEED MATRIX AMPLIFIER REDUCTION SYSTEM AND METHOD," previously incorporated by reference herein.

The outputs of the LPAs, or IF/RF converters 17-1 through 17-12 wherein LPAs are not used, are provided to antenna elements providing the multiple beam radiation pattern. These antenna elements may be individual antennas, such as those illustrated as antennas 18-1 through 18-12, or may be a multi-beam antenna. Moreover, through the use of a duplexer, the antennas utilized in the receive signal path may also be used in the transmit signal path. For example, a duplexer could be coupled to the outputs of IF/RF 17-1 through 17-12, or the LPAs if used, and to antennas 18-1 through 18-12, respectively, in order to utilize the same antennas in both the forward and reverse links.

Figure 2:
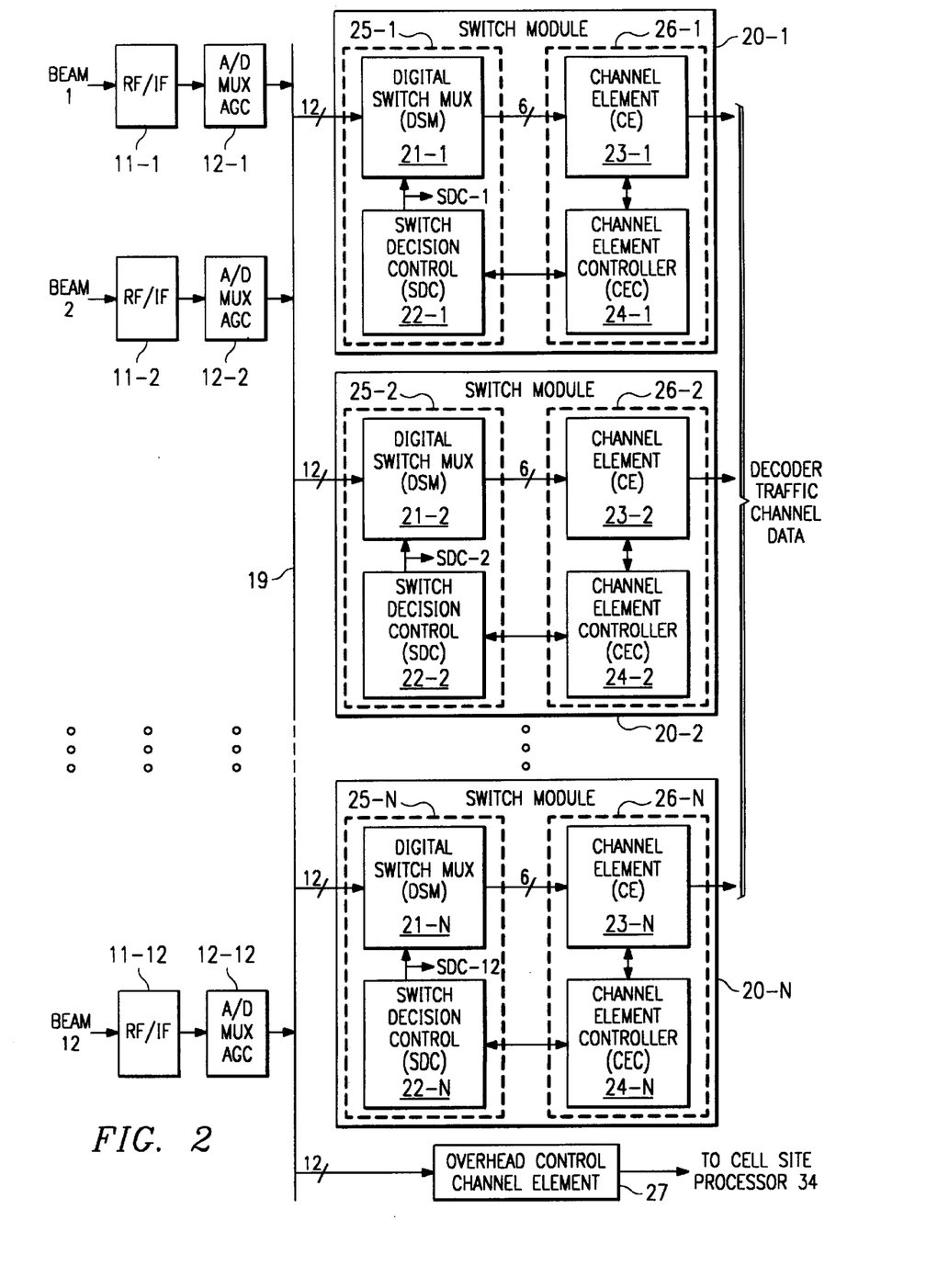
FIG. 2 illustrates a preferred embodiment of the receive signal path of the base transceiver station of FIG. 1.

Directing attention to FIG. 2, more details of the receive path illustrated in FIG. 1 are shown. As described above, the output from the twelve receive chains, RF/IF converter 11-1 and A/D converter 12-1 through RF/IF converter 11-12 and A/D converter 12-12, feed digital bus 19 which, in turn, feeds the switch elements.

FIG. 2 illustrates the elements of FIG. 1 in more detail, showing switch modules 20-1 through 20-N which include switch position control units, 25-1 through 25-N respectively, and channel element/controllers, 26-1 through 26-N respectively. It shall be appreciated that switch position control units 25-1 through 25-N are a part of switch matrix units 13-1 through 13-N, respectively, illustrated in FIG. 1. Likewise, channel element/controllers 26-1 through 26-N are a part of CDMA modulators/demodulators 14-1 through 14-N, respectively, illustrated in FIG. 1.

Elements making up switch modules 20-1 through 20-N, the interface to digital bus 19, include digital switch multiplexers (DSM) 21-1 through 21-N in each of the switch modules. The DSMs take the twelve logical signals provided each switch module from digital bus 19, one from each of the beams of the multi-beam antenna, and selects, under control of switch decision control units, those beams having most desirable attributes per channel, such as a strongest signal or a highest signal to interference ratio on a traffic channel associated with the particular DSM. Preferably, the best six of the beams are selected for passing to the channel element/controllers, as illustrated in FIG. 2. Of course, other numbers of beams determined to be advantageous could be utilized according to the present invention, if desired.

Switch decision control units (SDC) 22-1 through 22-N, of switch modules 20-1 through 20-N respectively, interface directly with a channel element controller (CEC) to supervise the switch function performed by the digital switch multiplexers. The switch decision control unit requests search data from the channel element controller, also obtaining timing information on the digital stream of data that is fed into the channel element controller.

In the preferred embodiment, the switch decision control unit compares measurements of the signal interference ratio from the despread signals being processed in the channel element controller. From this comparison, the switch decision control unit controls the coupled digital switch multiplexer to provide the best six of the twelve available inputs as signals to drive the channel element controller. Additionally, in a preferred embodiment, the SDCs also provide signals useful in controlling the forward link signal path, such as at connections SDC-1 through SDC-12.

The switch decision control unit keeps track of which demodulator elements in the channel element are actually assigned and locked on to receive paths and would not switch any of the logical inputs that were actively being demodulated. In other words, of the six inputs to the channel element, only a subset of those are going to be used at any given time and the switch decision control would only switch inactive inputs to the channel element to avoid disrupting the flow of decoded traffic channel data.

Preferably, the switch decision control units continuously update the settings of the switches in the digital switch multiplexers in order to maintain the best inputs as conditions change in the cell. In a typical cellular radio environment the updating of the digital switch multiplexer can take place on the order of every one to two seconds, which is relatively slow processing compared to the traffic channel data that is flowing through the channel element demodulator.

Switch modules 20-1 through 20-N also include channel elements (CE) 23-1 through 23-N coupled to the DSMs. The CEs despread the signals passed from the DSMs based on the user code or the user code delay. Thereafter, the CEs make a measurement of the signal's interference ratio for each of the 6 inputs, preferably as a function of time delay, and then under the supervision of CECs 24-1 through 24-N, demodulate the signal. The demodulated signal, in the form of decoded traffic channel data, is then sent to the cell site processor for processing as is well known in the art.

Digital data bus 19 also feeds a specialized set of switch modules 27, where there are preferably one or more of the specialized modules pulling off the 12 receive signals in order to process access channel information on the reverse link to detect mobiles that are trying to originate or terminate calls. The functions that are performed in 27 are similar to the functions performed in switch modules 20-1 through 20-N, with the exception that the processing is for the access channel rather than for a traffic channel.

The outputs of switch modules 20-1 through 20-N are the decoded traffic channel data that are passed on to the cell site controller and in most cases to the switching network cell site processor. Similarly, the outputs of specialized access channels switch module 27 are the decoded access channel data that are passed on to the cell site processor, such as cell site processor 34 shown in FIG. 3 and described below.

Figure 3:
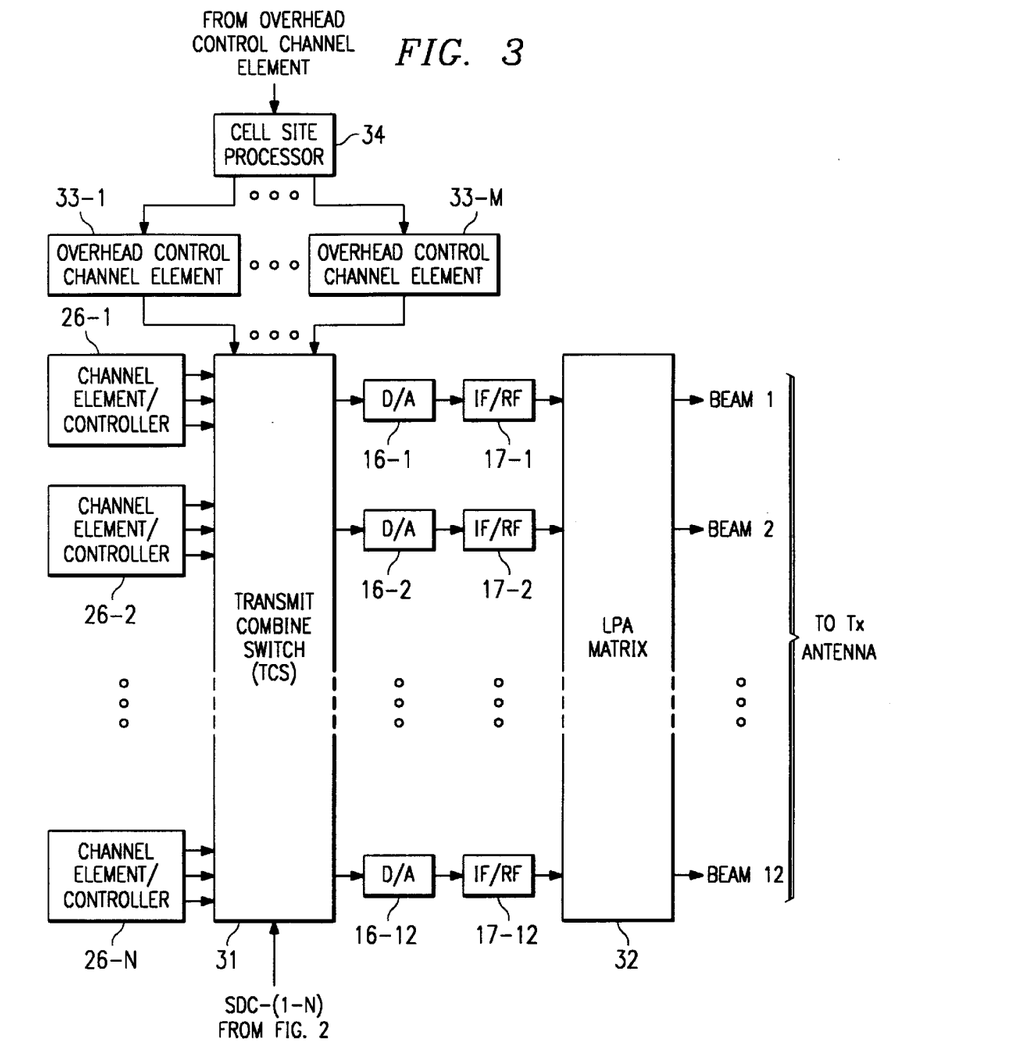
FIG. 3 illustrates a preferred embodiment of the transmit signal path of the base transceiver station of FIG. 1.

Turning now to FIG. 3, the transmit path of a preferred embodiment of the present invention is shown in more detail. There are shown a bank of channel element/controllers 26-1 through 26-N, corresponding to those shown in FIG. 2, that feed the forward transmit path data from the mobile telephone switching office, or telephone network, down to the mobiles.

Typically, the output of the channel element/controller has three components, as shown in FIG. 3, one for each of the three sectors of the cell site. If the mobile is in handoff with more than one sector then more than one of these three outputs will be used. If the mobile is in handoff with only one of the sectors of the cell then only one of those three outputs will be active.

The outputs from each of the channel element/controllers 26-1 through 26-N are fed to a transmit combined switch (TCS) 31. It shall be appreciated that TCS 31 of FIG. 3 is substantially the same as baseband transmit switch 15, illustrated in FIG. 1, showing additional detail. As described above with respect to baseband transmit switch 15, TCS 31 takes the traffic channel outputs from each of the channel elements and routes them to the best forward path antenna beams. Preferably, selection of the best forward path antenna beams is based on the received signal interference ratios that are provided at connection SDC-1 through SDC-N from switch decision control units 22-1 through 22-N, shown in FIG. 2, coupled to TCS 31 as shown in FIG. 3.

The beams with the best signal interference ratio are chosen by TCS 31 as the forward transmit path. In general, the TCS will pick the minimum number of beams necessary to transmit on the forward link to the mobile, in order to reduce the amount of forward link interference across the network.

TCS 31 also has inputs from overhead control channel elements 33-1 through 33-M. These specialized channel elements generate forward path signals that are to be simulcast over all of the beams for a given sector. These overhead channels may include pilot channels for synchronization of the carrier recovery at the mobile, synchronization channel for timing recovery of the mobile, and paging channel for alerting mobile to incoming calls and providing network control and parameter update information for the mobile. These overhead channels are sent into the transmit combine switch and then mapped to be a simulcast out from all of the antenna beams assigned to a given sector.

The outputs from TCS 31 feed into digital to analog converters 16-1 through 16-12, associated with each of the beams respectively, and then are fed into IF/RF conversion units 17-1 through 17-12. The outputs of the IF/RF conversion units then feed into an LPA linear power amplifier matrix 32 that drives the transmit assembly, which may include duplexers and/or antennas, for transmission of the forward link.

The forward path data for the channel elements 21-6 through 21-N as well as the overhead control channel elements 33-1 through 33-M comes from cell site processor 34. In most cases that data would be fed from the mobile telephone switching office, the telephone network, or the wire line network, to be transmitted to the mobile.

Returning again to FIG. 2, the input to channel elements 23-1 through 23-N have six logical inputs. In a typical cell site configuration, there would be 3 sectors times 2 diversity antennas for each sector, giving a total of six inputs. The input to the channel element controller has already been converted to baseband and digitized into digital samples that may be an arbitrary number of bits. Accordingly, the input to the channel element demodulator could be split into multiple signals and combined or multiplexed in different ways. For example, it could be split into an in phase and a quadrature component that would capture the magnitude and phase of a complex baseband signal so there could be more than six physical inputs to the channel element controller, but they would represent signals from typically six logical paths. The input to the channel element controller could also be multiplexed in such a way that, for example, signals from two diversity antennas, i.e., antenna 0 and antenna 1, could be placed on the same physical line. Accordingly, the same physical data channel input to the channel element controller could be multiplexed. DSMs 21-1 through 21-N would be able to accommodate any type of multiplex input requirements for the channel element as well as either in phase in quadrature or real time digital data inputs to the channel element.

On the reverse path, as well as the forward path, of BTS 10, shown in FIGS. 2 and 3, it is possible to aggregate the signals, overhead channels 33-1 through 33-M of FIG. 3 in particular, so that they are transmitted over different sets of beams. In other words, it is possible to change the mapping of beams to sectors such that the overhead channels for a given sector, for example, the alpha sector of a cell may be transmitted over different numbers of beams to effectively change the azimuthal beam width of the sector, as well as the azimuthal angle, or view, of the sector. Accordingly, the present invention operates to effectively shape the coverage of the cell, or coverage of the sectors, by utilizing arbitrary mappings of the overhead channels to various beams. Additionally, the present invention may operate to adjust a length of outboard reach of the sectors to shape the coverage of the cell. Beam to sector mapping, as well as adjusting the outboard reach of sectors is taught in U.S. patent application entitled "ANTENNA DEPLOYMENT SECTOR CELL SHAPING SYSTEM AND METHOD", previously incorporated herein by reference.

Correspondingly, according to the present invention the received signal inputs from FIG. 2 above 19 may be arbitrarily mapped to demodulator channel elements 23-1 through 23-N in such a way that it matches the forward link mapping, the forward link cell shaping that has been created from the mapping of sectors to beam. As such, the present invention may be used to provide for increased capacity in selected regions of the cell by intelligently mapping sectors as described above.

Although the present invention and its advantages have been described in detail, it should be understood that various changes, substitutions and alterations can be made herein without departing from the spirit and scope of the invention as defined by the appended claims.

What is claimed is:

1. A multi-sectored CDMA receiver system having a plurality of CDMA channels associated therewith and utilizing a multi-beam antenna having a plurality of predefined narrow beams, each beam having a receive signal associated therewith for input into a demodulation input of a plurality of demodulation inputs of a CDMA receiver, wherein ones of said plurality of demodulation inputs are associated with ones of said sectors, said system comprising:

means for switchably providing any of said beam receive signals to select ones of said demodulation inputs, wherein said switchably providing means includes a plurality of independently operable switching circuits each assigned to a different one of said CDMA channels; and means for controlling said switchably providing means, said controlling means providing a signal to each of said independently operable switching circuits utilized in causing said switching circuits to allow only a select subset of said beam receive signals to pass to a demodulation input of the plurality of demodulation inputs each associated with a particular switching circuit of the plurality of independently operable switching circuits.

2. The system of claim 1, wherein said subset of beam receive signals is selected as a function of channel search data associated with ones of said beam receive signals.

3. The system of claim 2, wherein said measurements of said channel search data is provided by a channel element controller in communication with said controlling means.

4. The system of claim 1, wherein said subset of beam receive signals is selected as a function of a comparison of measurements of a signal interference ratio of at least a portion of ones of said beam receive signals.

5. The system of claim 4, wherein said measurements of said signal interference ratio is provided by a channel element controller in communication with said controlling means.

6. The system of claim 1, wherein said switchably providing means comprise:

a plurality of digital switch multiplexers each associated with a particular one of said CDMA channels.

7. The system of claim 6, wherein said digital switch multiplexers are each coupled to a different channel element of said CDMA receiver.

8. The system of claim 1, further comprising:

means for isolating overhead channels present in ones of said beam receive signals and for providing said isolated overhead channels to a cell site processor.

9. The system of claim 8, wherein an azimuthal size of at least one of said sectors is dynamically adjustable as a function of a number of said beams associated with ones of said overhead channels by said cell site processor.

10. The system of claim 1, wherein said select subset of beam receive signals comprises 6 beam receive signals.

11. The system of claim 10, wherein a number of said plurality of predefined narrow beams is 12, and wherein said narrow beams are disposed to provide substantially non-overlapping coverage throughout a cell associated with said CDMA receiver.

12. The system of claim 1, further comprising:

means for independently converting each of said beam receive signals from a received radio frequency to a preselected intermediate frequency; and means for independently converting each of said beam receive signals from an analogue signal to a digital signal.

13. A multi-sectored CDMA transmitter system having a plurality of CDMA channels associated therewith and utilizing a multi-beam antenna having a plurality of predefined narrow beams, each beam having a transmit signal associated therewith for radiation of at least one output of a plurality of modulation outputs of a CDMA transmitter, wherein ones of said plurality of modulation outputs are associated with ones of said sectors, said system comprising:

means for switchably providing any one of said modulation transmitter outputs to any of said beam transmit signals, wherein said switchably providing means includes a plurality of independently operable switching circuits each assigned to a different one of said CDMA channels; and means for controlling said switchably providing means, said controlling means providing a signal to each of said independently operable switching circuits utilized in causing said switching circuits to allow each of said modulation transmitter outputs to pass only to a select subset of said beam transmit signals.

14. The system of claim 13, wherein said subset of said beam transmit signals is selected as a function of channel search data associated with ones of a plurality of receive signals.

15. The system of claim 14, wherein said measurements of said channel search data is provided by a channel element controller in communication with said controlling means.

16. The system of claim 13, wherein said subset of beam transmit signals is selected as a function of a comparison of measurements of a signal interference ratio of at least a portion of ones of a plurality of receive signals.

17. The system of claim 16, wherein said measurements of said signal interference ratio is provided by a channel element controller in communication with said controlling means.

18. The system of claim 13, further comprising:

means for providing an overhead channel to select ones of said beam transmit signals, said overhead channel providing means operable with said switchably providing means to combine signals associated with ones of said modulation transmitter outputs switchably provided to said select ones of said beam transmit signals with said overhead channel.

19. The system of claim 18, wherein an azimuthal size of at least one of said sectors is dynamically adjustable as a function of a number of said beams provided said overhead channel.

20. The system of claim 13, wherein said select subset of beam transmit signals comprises 2 beam transmit signals.

21. The system of claim 20, wherein a number of said plurality of predefined narrow beams is 12, and wherein said narrow beams are disposed to provide substantially non-overlapping coverage throughout a cell associated with said CDMA transmitter.

22. The system of claim 13, further comprising:
means for independently converting each of said beam transmit signals from a digital signal to an analogue signal; and
means for independently converting each of said beam transmit signals from an intermediate frequency to a preselected radio frequency.

23. A system for utilizing a multi-beam antenna system having a plurality of predefined narrow beams with a multi-sectored CDMA base transceiver station utilizing a plurality of CDMA channels, each beam providing a beam input signal suitable for input into a demodulation receiver having a plurality of inputs, each beam also providing radiation of a beam output signal substantially within a predefined area, said beam output signals adapted to accept a signal output from a modulation transmitter having a plurality of outputs, wherein ones of said plurality of demodulation receiver inputs and ones of said plurality of modulation transmitter outputs are associated with ones of said sectors, said system comprising:
a baseband receive switch bank switchably providing any of said beam input signals to selected ones of said demodulation receiver inputs, wherein said baseband receive switch bank includes a plurality of independently operable receive switching circuits each assigned to a different one of said CDMA channels;
a baseband transmit switch bank switchably providing any of said modulation transmitter outputs to selected ones of said beam output signals, wherein said baseband transmit switch bank includes a plurality of independently operable transmit switching circuits each assigned to a different one of said CDMA channels; and
means for controlling said baseband receive switch bank and said baseband transmit switch bank.

24. The system of claim 23, further comprising:
means for dynamically adjusting a size of said sectors.

25. The system of claim 24, wherein said size of said sectors is adjusted by said adjusting means at least in part as a function of a number of said beam output signals switched to a control channel by said baseband transmit switch bank.

26. The system of claim 23, wherein ones of said plurality of independently operable receive switching circuits of said baseband receive switch bank comprise a digital switch multiplexer.

27. The system of claim 26, wherein said digital switch multiplexers are each coupled to a different channel element of said CDMA transceiver.

28. The system of claim 23, wherein said selected ones of said demodulation receiver inputs are selected by said baseband receive switch bank as a function of channel search data associated with ones of said beam input signals.

29. The system of claim 28, wherein said measurements of said channel search data is provided by a channel element controller in communication with said controlling means.

30. The system of claim 23, wherein said selected ones of said beam output signals are selected as a function of measurements of channel search data associated with ones of said beam input signals.

31. The system of claim 30, wherein said measurement of said channel search data is provided by a channel element controller in communication with said controlling means.

32. A method for utilizing a multi-beam antenna having a plurality of predefined narrow beams with a multi-sectored CDMA base transceiver station utilizing a plurality of CDMA channels, each beam providing a beam input signal suitable for input into a demodulation receiver having a plurality of inputs, each beam also providing radiation of a beam output signal substantially within a predefined area, said beam output signals adapted to accept a signal output from a modulation transmitter having a plurality of outputs, wherein ones of said plurality of demodulation receiver inputs and ones of said plurality of modulation transmitter outputs are associated with ones of said sectors, said method comprising the steps of:
switchably inputting ones of said beam input signals to selected ones of said demodulation receiver inputs, wherein said switchably inputting step utilizes a plurality of independently operable input switching circuits each assigned to a different one of said CDMA channels, and wherein said independently operable input switching circuits are adapted to switchably provide any of said beam input signals to any of said demodulation receiver inputs;
switchably outputting ones of said modulation transmitter outputs to selected ones of said beam output signals, wherein said switchably outputting step utilizes a plurality of independently operable output switching circuits each assigned to a different one of said CDMA channels, and wherein said independently operable output switching circuits are adapted to switchably provide any of said modulation outputs to any of said beam output signals; and
controlling said input switching circuits and said output switching circuits as a function of channel search data associated with ones of said beam input signals.

33. The method of claim 32, further comprising the step of:
dynamically adjusting a size of said sectors.

34. The method of claim 33, further comprising the step of:
providing an overhead channel to select ones of said beam output signals, said overhead channel providing step combining signals associated with ones of said modulation outputs provided to said select ones of said beam output signals with said overhead channel.

35. The system of claim 34, wherein an azimuthal size of at least one of said sectors is adjusted at least in part as a function of a number of said beams provided said overhead channel.

36. The method of claim 32, wherein said measurements of said channel search data is provided by a channel element controller.

37. The method of claim 32, further comprising the steps of:
converting said beam input signals from a radio frequency to an intermediate frequency; and
converting said beam input signals from an analogue signal to a digital signal.

38. The method of claim 32, further comprising the steps of:
converting said beam output signals from a digital signal to an analogue signal; and
converting said beam output signals from an intermediate frequency to a radio frequency.

39. A system comprising:
a multi-sectored CDMA receiver having a plurality of CDMA channels associated therewith, wherein said CDMA receiver includes a plurality of demodulation inputs, wherein ones of said plurality of demodulation inputs are associated with ones of said sectors;

a multi-beam antenna having a plurality of substantially non-overlapping narrow beams, each beam having an antenna beam signal associated therewith;

a switch adapted to provide mapping of any of said antenna beam signals to select ones of said demodulation inputs, wherein said switch may be controlled to couple combinations of antenna beam signals to demodulation inputs including multiple antenna beam signals to a same demodulation input and multiple demodulation inputs to a same antenna beam signal; and a controller coupled to said switch and providing signals to said switch to allow selective pluralities of said antenna beam signals to pass to each demodulation input of the plurality of demodulation inputs.

40. The system of claim 39, wherein an area of service associated with each sector of said multi-sectored CDMA receiver is defined by said selective pluralities of said antenna beam signals passed to demodulation inputs of the plurality of demodulation inputs.

41. A system comprising:

a multi-sectored CDMA transmitter having a plurality of CDMA channels associated therewith, wherein said CDMA transmitter includes a plurality of modulation outputs, wherein ones of said plurality of modulation outputs are associated with ones of said sectors;

a multi-beam antenna having a plurality of substantially non-overlapping narrow beams, each beam having an antenna beam signal associated therewith;

a switch adapted to provide mapping of any of said antenna beam signals to select ones of said modulation outputs, wherein said switch may be controlled to couple combinations of antenna beam signals to modulation outputs including multiple antenna beam signals to a same modulation output and multiple modulation outputs to a same antenna beam signal; and a controller coupled to said switch and providing signals to said switch to allow signals from each modulation output of the plurality of demodulation inputs to pass to selective pluralities of said antenna beam signals.

42. The system of claim 41, wherein an area of service associated with each sector of said multi-sectored CDMA receiver is defined by said selective pluralities of said antenna beam signals from each modulation output is passed to.

43. The system of claim 1, wherein said signals provided to said switching circuits by said controlling means cause said switchably providing means to define different coverage patterns based on a type of channel communicated therein.

44. The system of claim 43, wherein said types of channel communicated includes at least two types of channels selected from the group consisting of:

a traffic channel;

an overhead channel;

a pilot synchronization channel; and a paging channel.

45. The system of claim 43, wherein a first type of channel communicated is a traffic channel and said beam receive signals provided to a demodulation input associated with said traffic channel are beam receive signals selected for providing a best link, and wherein a second type of channel communicated is a control channel and said beam receive signals provided to a demodulation input associated with said control channel are beam receive signals selected to define a sector associated with said control channel.

46. The system of claim 1, wherein said signals provided to said switching circuits by said controlling means couple different numbers of said beam receive signals to different ones of said demodulation inputs.

47. The system of claim 13, wherein said signals provided to said switching circuits by said controlling means cause said switchably providing means to define different coverage patterns based on a type of channel communicated therein.

48. The system of claim 47, wherein said types of channel communicated includes at least two types of channels selected from the group consisting of:

a traffic channel;

an overhead channel;

a pilot synchronization channel; and a paging channel.

49. The system of claim 47, wherein a first type of channel communicated is a traffic channel and said beam transmit signals coupled to said modulation transmitter output associated with said traffic channel are beam transmit signals selected for providing a best link, and wherein a second type of channel communicated is a control channel and said beam transmit signals coupled to said modulation transmitter output associated with said control channel are beam transmit signals selected to define a sector associated with said control channel.

50. The system of claim 13, wherein said signals provided to said switching circuits by said controlling means couple different numbers of said beam transmit signals to different ones of said modulation outputs.

51. The system of claim 23, wherein said controlling means is adapted to dynamically control at least one of said baseband receive switch bank and said baseband transmit switch bank to define different coverage patterns for traffic channels and control channels.

52. The method of claim 32, wherein said controlling step includes the step of:

controlling at least one of said input switching circuits and said output switching circuits to dynamically define different coverage patterns for traffic channels and control channels.

* * * * *